(12) United States Patent
Golec

(10) Patent No.: US 12,071,992 B2
(45) Date of Patent: Aug. 27, 2024

(54) BRAKE PAD FOR A BICYCLE OR A MOTORBIKE DISC BRAKE ASSEMBLY

(71) Applicant: Marcin Golec, London (GB)

(72) Inventor: Marcin Golec, London (GB)

(*) Notice: Subject to any disclaimer, the term of this patent is extended or adjusted under 35 U.S.C. 154(b) by 258 days.

(21) Appl. No.: 17/472,638

(22) Filed: Sep. 12, 2021

(65) Prior Publication Data

US 2022/0082142 A1 Mar. 17, 2022

(30) Foreign Application Priority Data

Sep. 14, 2020 (EP) .................................. 20195945

(51) Int. Cl.
*F16D 65/092* (2006.01)
*F16D 65/78* (2006.01)
*F16D 65/847* (2006.01)

(52) U.S. Cl.
CPC ......... *F16D 65/092* (2013.01); *F16D 65/847* (2013.01); *F16D 2065/788* (2013.01); *F16D 2200/0021* (2013.01); *F16D 2250/0084* (2013.01)

(58) Field of Classification Search
CPC .................. F16D 65/092; F16D 65/847; F16D 2065/788; F16D 2250/0084; F16D 2200/0021
See application file for complete search history.

(56) References Cited

U.S. PATENT DOCUMENTS

| 10,088,002 B2 * | 10/2018 | Wen ...................... F16D 65/092 |
| 2012/0318621 A1 * | 12/2012 | Teagan .................. F16D 55/225 188/71.6 |
| 2015/0211590 A1 * | 7/2015 | Tseng .................. F16D 69/0408 188/250 B |

OTHER PUBLICATIONS

German Patent No. DE 102011051344 to Fujitani et al published on Jan. 5, 2012.*
Chinese Patent No. CN 202557717 to Chen published on Nov. 28, 2012.*
Chinese Patent No. CN 203161926 to Wang published on Aug. 28, 2013.*
Chinese Patent No. CN 203892422 to Wen published on Oct. 22, 2014.*

* cited by examiner

*Primary Examiner* — Pamela Rodriguez
(74) *Attorney, Agent, or Firm* — Rivka Friedman

(57) ABSTRACT

The present invention relates to brake pad for a bicycle or a motorbike disc brake assembly comprising: a backing plate (1) having a front surface (2) and a rear surface (3), a friction pad (4) disposed on the front surface (2) or the rear surface (3) of the backing plate (1), and a backing plate extension (5) extending from the backing plate (1), wherein the backing plate extension (5) is provided with at least one cutout, wherein the at least one cutout has an inner wall surrounding the cutout, and wherein at least a part of the inner wall is provided at an inclination other than 90° with respect to the area of the backing plate extension (5) adjacent to the cutout.

15 Claims, 4 Drawing Sheets

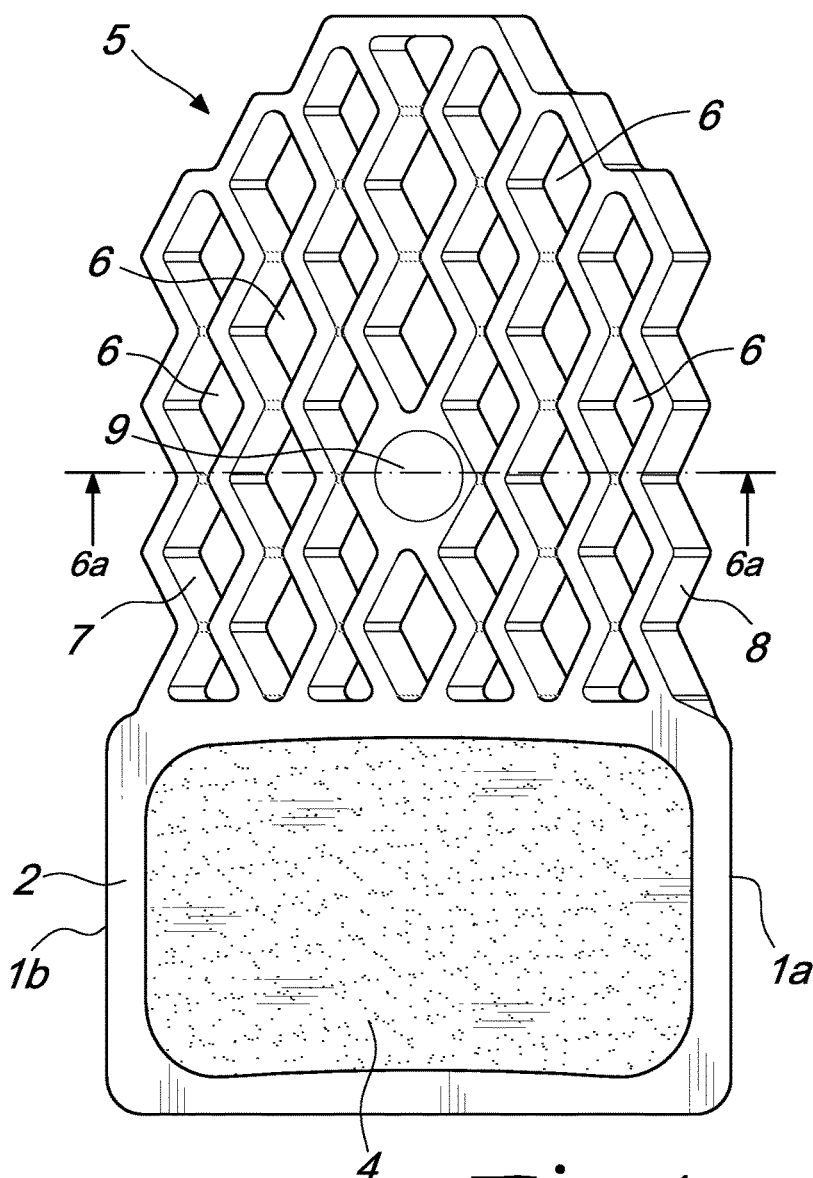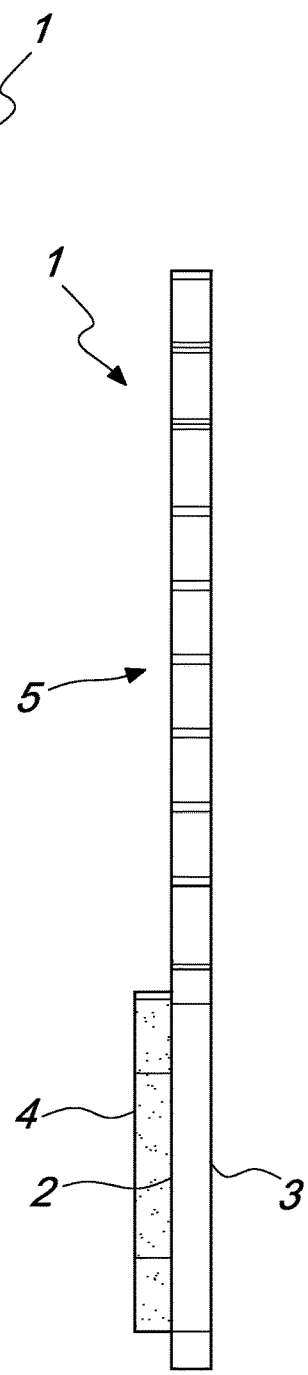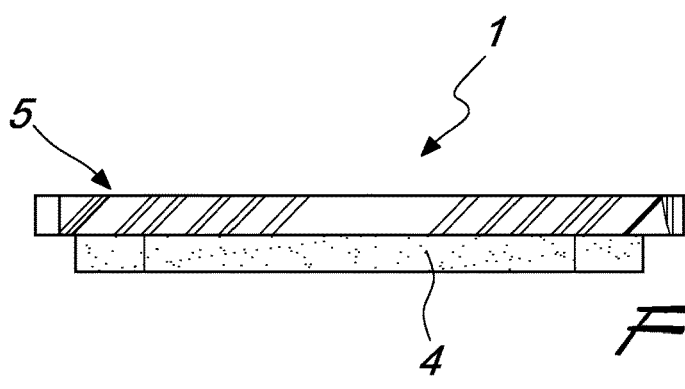

BRAKE PAD FOR A BICYCLE OR A MOTORBIKE DISC BRAKE ASSEMBLY

BACKGROUND OF THE INVENTION

The present invention is directed to brake pad for a bicycle or a motorbike disc brake assembly and, more particularly, to a heat dissipation brake pad.

Biking or motor biking is becoming more and more popular as a means of transportation, like utility cycling, as a leisure activity and also as a competitive sport, like racing, bicycle touring or mountain biking. The bicycle and the motorbike industry are constantly increasing their offers of bicycles and motorbikes for all of these areas of use and improving their components.

One of the components that were constantly improved during the last years is the disc brake assembly. The problem with disc brake assemblies is that during the use of the bicycle or the motorbike, the assemblies need to provide a very good friction in order to stop the bicycle or motorbike in a quick and reliable manner. In addition, disc brake assemblies must also have a good heat resistance.

Generally, as known in the art, a disc braking assembly includes brake pad made of a backing plate which is usually manufactured of steel and friction pad made of a friction material and glued or otherwise bonded to the backing plate. During the braking action heat is generated by the friction of the pad with a disc brake rotor of the assembly. The generated heat needs to be dissipated in a fast manner. If the heat dissipation is not fast enough, the brake pad may overheat, in particular during long descents, and this leads to a loss of breaking power of the assembly (called brake fading). The user will then press on the brake lever even harder which in turn increases the heat of the brake pad even further with subsequent further loss in the breaking power.

Several attempts have been made in the prior art to improve the heat exchange behavior of braking assemblies including backing plates and friction pads.

As well known in the art, there are three types of heat transfer as far as the backing plate is concerned. In the following the terms heat and thermal will be used in an interchangeable manner.

One type of heat transfer is conduction which is the transfer of the thermal or heat energy through direct contact between the backing plate and the friction material of the friction pad. By the direct contact between the backing plate and the friction pad, the heat is transferred from the pad to the backing plate where it can be dissipated.

A further type of heat transfer is convection by means of which the thermal energy is transferred through the movement of air around the backing plate acting as a radiator. In this manner, the air takes the thermal energy out of the radiator/backing plate. Obviously, in this case, the radiator surface influences the dissipation of thermal energy.

A further type of heat transfer is the transfer of the thermal energy through the thermal radiation by means of electromagnetic waves emission from the surface. This type of heat exchange is functionally similar to that of infrared lamps used to heat you up in winter or cold weather.

As mentioned, a conventional brake assembly includes a brake pad having two components, namely a backing plate usually made of steel and a friction pad made of a friction material glued or otherwise bonded to the backing plate. However, while steel is advantageous in view of its stiffness and stability, the propagation of the heat is limited, as one cannot really influence thermal conduction of steel, inasmuch as all types of steels have more or less the same thermal conductivity values.

A standard brake pad with a steel made backing plate is for example disclosed in U.S. Pat. No. 6,206,151 B1, where a friction pad is disposed on the front surface of the backing plate. The backing plate further includes at the rear surface thereof a groove to facilitate heat dissipation caused by friction between the friction pad and the disc brake rotor of the disc brake assembly. While the groove improves to a certain extent the dissipation of heat by providing a ventilation, the amount of heat dissipation by the groove is still limited. Furthermore, the emission of heat provided by the known prior art arrangement is also unsatisfactory.

Other solutions found in the prior art are modifying the backing plate so that it has a larger cooling surface or adding a radiator to the brake pad, as discussed for instance in DE 10 2011 123 009 B3. In particular, DE 10 2011 123 009 B3 discloses a brake pad made of three components: the backing plate, a plate made of aluminum with a radiator on top and a friction pad. The radiator shown in DE 10 2011 123 009 B3, namely the surface facing out of the backing plate, is not large enough to provide for an efficient solution to the heat dissipation problem. Also, the heat exchange is not sufficient enough, since the air only flows through the radiator fins. Accordingly, the air captures the thermal energy of the radiator but is not able to leave the radiator freely. Therefore, the heat captured by the air is transmitted back to the brake pad. In addition, the emission behavior of the know radiator is not satisfactory, as the radiation of heat occurs by emitting heat from one fin of radiator to another fin thereof, and in this manner the heat does equally not leave the radiator. As generally known in the art, the emission is responsible for up to 25% of total heat exchange of a radiator of the like with the surrounding air.

Various other forms of radiators are used in disclosures like U.S. Pat. No. 10,088,002 B2 which pertains to a device for braking a vehicle including a brake pad, a back plate coupled to the brake pad and a plurality of ridges provided on a face of the brake plate, DE 10 2015 117 607 B4 which pertains to a removable heat-dissipating member for brake pads, DE 20 2016 102 626 U1 which discloses a cooling structure of a bicycle brake comprising a disc, a cooling plate and a cooling element, wherein a channel is formed between the cooling plate and the cooling element, such that air can dissipate heat through the channel, EP 3 604 848 A1 which discloses a pad for a bicycle disc brake, wherein the pad comprises a heat-dissipating element made of a material having a well-defined thermal expansion coefficient, or EP 3 415 411 A2 which pertains to a pad for a bicycle disc brake, comprising at least one heat-dissipating element. All these radiators have very big surfaces facing each other and a small surface facing out of the brake pad making the heat dissipation, in particular the radiative emission of heat, not very effective.

In view of the foregoing, it is an object of the present invention to provide for a more effective brake pad for a bicycle or a motorbike disc brake assembly that allows more heat to dissipate from the brake pad.

Within the framework of the above object, the present invention also aims at providing for a more effective brake pad for a bicycle or for a motorbike disc brake assembly with an improved heat dissipation behavior due in particular to the improved heat emission behavior of the brake pad.

Within the above object, the present invention also additionally aims at providing for a more effective brake pad for a bicycle or motorbike disc brake assembly with an improved heat dissipation behavior, in particular as far as convection is concerned.

SUMMARY OF THE INVENTION

The above objects and further objects which will become apparent hereinafter are solved by a brake pad for a bicycle or a motorbike disc brake assembly as defined in independent claim 1. Further advantageous aspects of the present invention are set out in the dependent claims.

The present invention therefore relates in general terms to a brake pad for a bicycle or a motorbike disc brake assembly comprising a backing plate having a front surface and a rear surface, a friction pad disposed on the front surface or rear surface of the backing plate, and a backing plate extension extending from the backing plate, wherein the backing plate extension is provided with at least one cutout, wherein the at least one cutout has an inner wall surrounding the cutout, and wherein at least a part of the inner wall is provided at an inclination other than 90° with respect to the area of the backing plate extension adjacent to the cutout.

Preferably the braking plate and the breaking plate extension are made in one piece and/or the breaking plate is made from solid material and/or the braking plate extension is made from solid material with the cutout or cutouts formed therein. Preferably the breaking plate made from solid material is monolithically cast and/or the braking plate extension made from solid material is monolithically cast with the cutout or cutouts formed therein during casting or subsequently.

In this way, according to the invention, the brake pad not only allows for free air movement through the backing plate extension to maximize the convection effect, but also allows the propagation of the heat radiation out of the backing plate, such as to maximize the heat emission performance of the brake pad.

Advantageously, the backing plate extension is provided with a plurality of cutouts and each cutout has a respective inner wall surrounding the cutout. At least a part of each respective inner wall is provided at an inclination other than 90° with respect to the area of the backing plate extension adjacent to the respective cutout. The plurality of cutouts increases the available free surface which can be used both for emission of thermal energy and for convection.

Preferably, the backing plate extension is planar and/or preferably the inclination of at least a part of each inner wall is the same. If the inclination of the entire inner wall is the same, the cutout has an oblique appearance. Same is true for a plurality of cutouts which are thus aligned along a common oblique line. In this way the manufacturing of the brake pad as a whole is rendered simpler, in particular if the cutouts are manufactured by laser cutting in the backing plate extension.

In a preferred embodiment of the invention, the inclination of the inner wall of the cutout is from 30° to 60°, more preferably from 40° to 50° and most preferably of about 45° with respect to the backing plate extension. In this manner, the radiation of heat between opposing inner wall sections is minimized and the emission of heat is directed away from an opposing inner wall section. It will be appreciated by the person skilled in the art that the most preferred angle of inclination of 45° directs the radiation of heat, and thus the emission, from one section of the inner wall essentially away from any opposing inner wall sections of the cutout. The size of the cutout vs. the thickness of the cutout determines whether the emission from one section of the inner wall of the cutout will impinge or not on the opposing section of the inner wall of that cutout. At any rate, even if there is an overlap in mutually opposing inner wall sections of the cutout, the inclination according to the present invention reduces the amount of overlap as compared to conventional cutouts with vertical (90°) inner walls. At this point, the person skilled in the art will appreciate that the emission of heat or the radiation of heat does not only take place at one angle to the emitting or radiating surface. It is well known to the person skilled in the art that radiation intensity has a well-defined directional distribution of the emitted radiation to the hemisphere above the surface, which is not uniform. It is more of a shape of an ellipse perpendicular to the surface, where the biggest magnitude of radiation emitted from the surface is perpendicular to the emitting surface. Therefore, the present invention solves the problem of the heat emission or heat radiation propagating between opposing surfaces of the inner wall of the cutout and remaining within the cutout by providing the whole inner wall or sections thereof at an inclination as defined herein. Accordingly, the heat emission or heat radiation will leave the cutout faster and at a higher ratio than in conventional perpendicular cutouts.

The present invention also advantageously provides for a larger surface in the backing plate, inasmuch as cutting the cutouts of backing plate extension in a direction which is not perpendicular to the surface of the backing plate extension increases the overall surface of the backing plate as compared to conventional cutouts with vertical (90°) inner walls. Most preferably an angle of 45° of the respective inner walls of the cutouts maximizes the surface area available for convection and radiation. However, the other preferred ranges of for instance 30° to 60° and 40° to 50° for the cutout inclination angle also increase the surface of the backing plate available for convection and radiation.

Preferably, the cutout or cutouts has/have a shape selected from circular, elliptic, triangular, rectangular, rhombic, pentagonal, hexagonal and polygonal. Currently, a rhombic shape is envisaged as particularly advantageous in terms of the thermal dissipation and of the manufacturing constraints.

More preferably, the backing plate and/or the backing plate extension has/have a thickness from 1.5 mm to 2.0 mm, more preferably from 1.5 mm to 1.9 mm and most preferably from 1.5 mm to 1.8 mm.

Even more preferably, the backing plate and the backing plate extension are coplanar and have the same thickness. In alternative the backing plate and/or the backing plate extension may be curved or slightly curved.

In another preferred embodiment of the present invention, the backing plate and/or the backing plate extension are made of metal, preferably of steel. Steel is advantageous in terms of its stability and stiffness and allows to increase or maximize the surface and/or the number of the cutouts. This, in turn, provides for an improved heat dissipation.

Advantageously, the backing plate is substantially rectangular and the friction pad takes up about 70% of the front surface thereof.

Preferably, backing plate extension includes a connecting bolt hole for mounting the brake pad to a brake caliper.

More preferably, the inclination of the inner wall of the cutout is such that the opposing sections of the inner wall of the cutout only partially face each other or do not face each other at all. Accordingly, the radiation of heat or the thermal emission from a wall section of a cutout to an opposing wall section of the same cutout is minimized.

Even more preferably, the inclination of the inner wall of the cutout is such that the inner wall has a section which directs the radiation heat in part or fully away from the opposing section of the inner wall. Accordingly, the radiation of heat or the thermal emission between opposing wall sections is practically avoided.

In another preferred embodiment of the invention, the backing plate extension extends out of a brake caliper in the mounted state thereof in a radial extension as compared to a wheel on which the brake pad is mounted. Preferably the extension of the backing plate extension out of the brake caliper is preferably in the order of 10 mm to 60 mm. The latter preferred embodiments allow for more surface contact of the backing plate extension with the air, such that the convection behavior is further improved.

Advantageously, the backing plate extension has a generally rectangular configuration with a tip pointing away from the backing plate, such that the portion of the backing plate extension adjacent to the backing plate is wider than the portion of the of the backing plate extension distant to the backing plate. By this particular shape, the heat dissipation behavior, in particular the convection behavior is further improved.

In another preferred embodiment, the backing plate is provided with a leading edge and a trailing edge and the backing plate extension has a generally rectangular configuration. In the latter preferred embodiment, the extent of the backing plate extension between the leading edge and trailing edge is shorter than the extent of the backing plate extension extending away from the backing plate. By this particular shape, the heat dissipation behavior, in particular the convection behavior, is further improved.

Even more preferably, the backing plate extension has a perimeter and at least a part of the perimeter is provided at an inclination other than 90° with respect to the area of the backing plate extension adjacent to the perimeter. In this manner the heat dissipation surface of the backing plate is further increased and in consequence the heat dissipation behavior, in particular the convection behavior, is further improved.

Further, preferably, the backing plate extension is planar and the inclination of the perimeter is the same as the inclination of the inner wall(s) of the cutout(s). Accordingly, the manufacturing constraints for the backing plates are simplified, in particular if the cutouts are manufactured by laser cutting in the backing plate extension.

Tests performed by the inventor have shown that it is advantageous if the cutouts take up 30% to 90% of the surface of the backing plate extension, more preferably if the cutouts take up 50% to 80% of the surface of the backing plate extension or if the cutouts take up 60% to 80% of the surface of the backing plate extension. The latter advantageous embodiment maximizes the surface available to heat dissipation (both in terms of radiation and convection) and also reduces the weight of the backing plate.

Further features and advantages of the present invention will become clearer from the following detailed description of the preferred embodiment thereof, made with reference to the attached drawings.

DESCRIPTION OF THE DRAWINGS

FIG. 1 is a schematic front view of a brake pad according to the present invention;

FIG. 2 is a schematic lateral side view of the brake pad of FIG. 1;

FIG. 3 is a schematic top side view of the brake pad of FIG. 1;

DETAILED DESCRIPTION OF THE EMBODIMENTS

Figure 4:
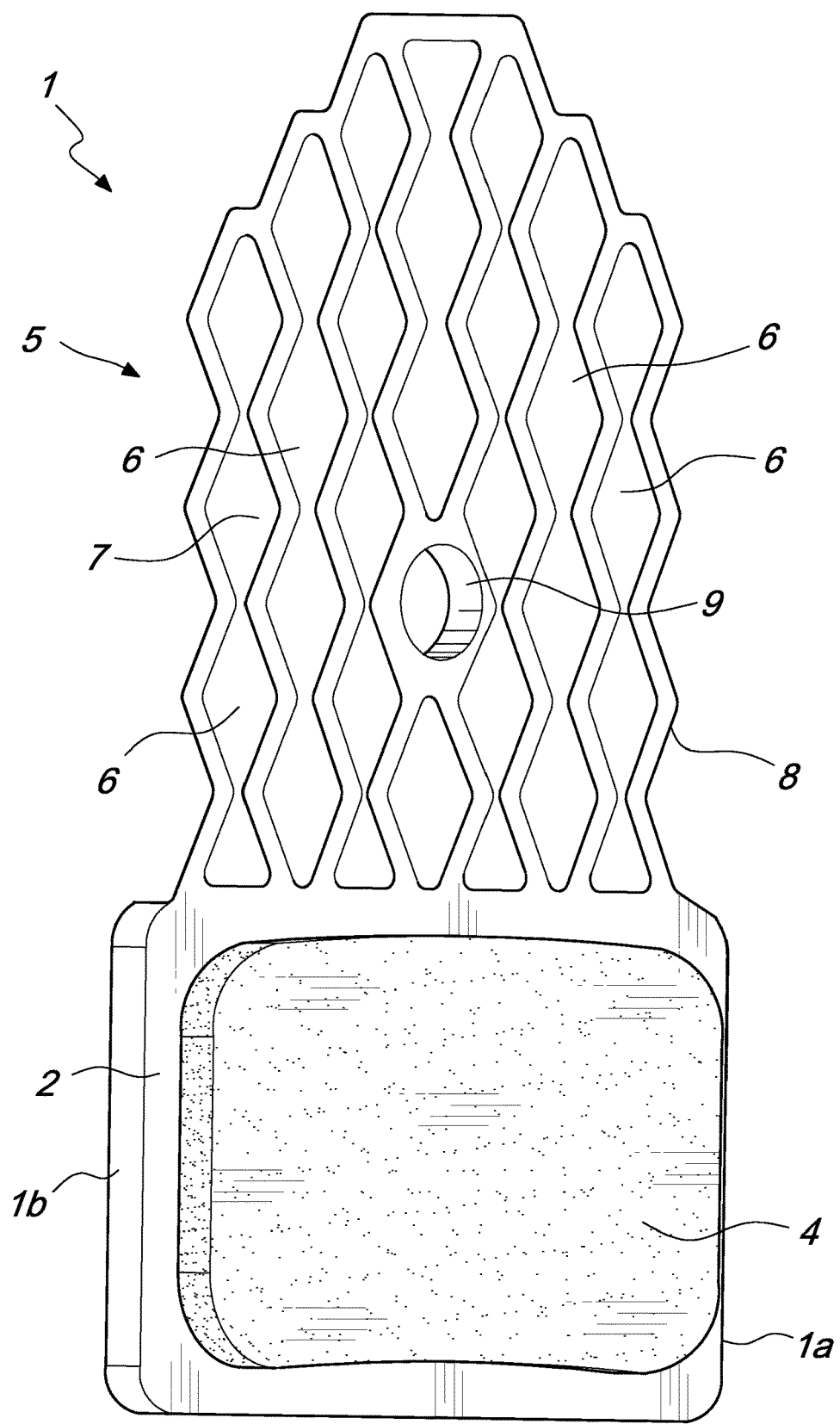
FIG. 4 is a schematic perspective view at 45° of the brake pad of FIG. 1.
Figure 5:
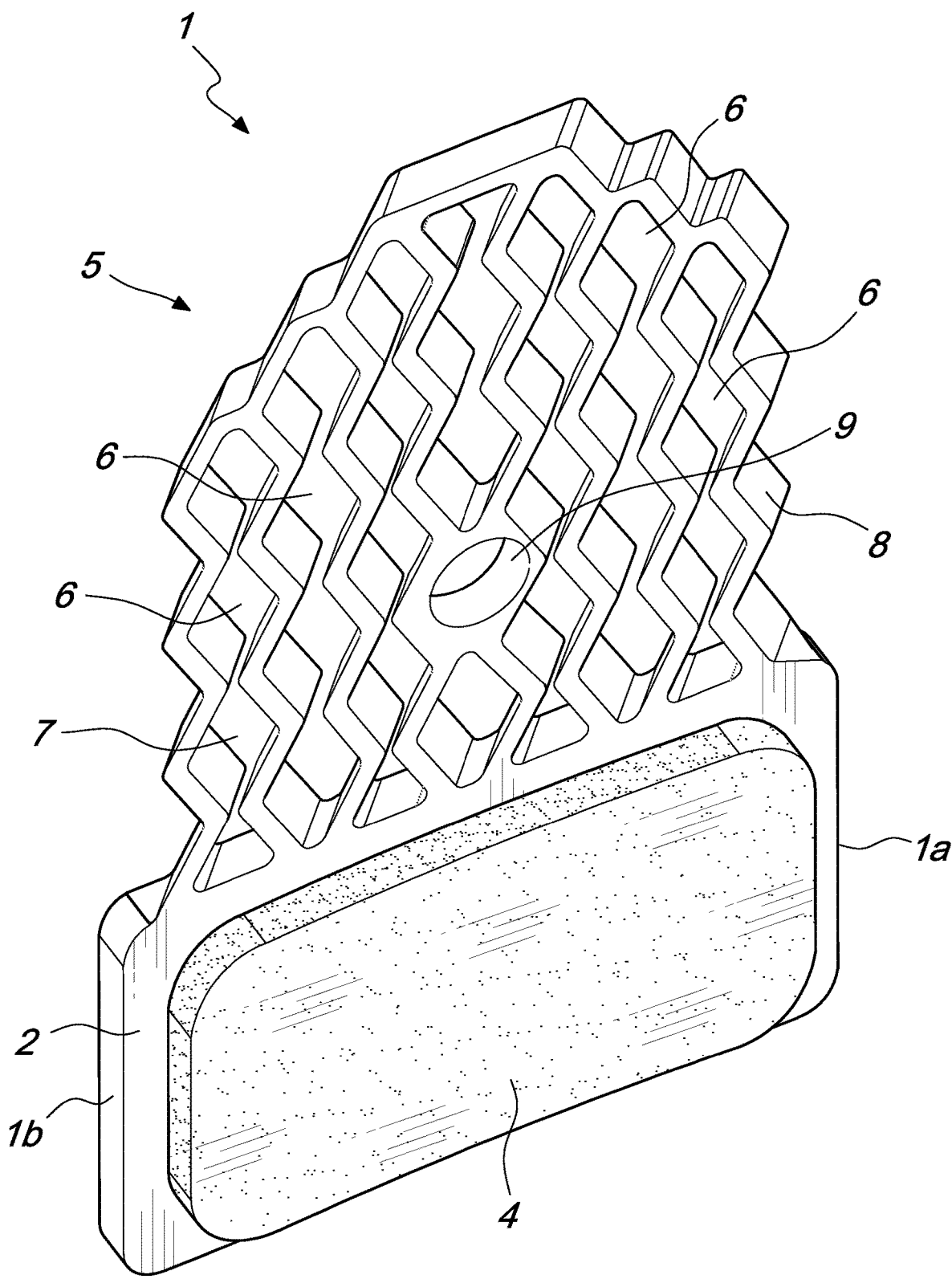
FIG. 5 is a further schematic perspective view of the brake pad of FIG. 1.

In the following, the present invention will be described in detail in connection with the currently preferred embodiments thereof and with reference to the appended FIGS. 1 to 7.

FIG. 1 shows a schematic front view of a brake pad for a bicycle or a motorbike disc brake assembly having a backing plate 1 with a front surface 2 and a rear surface 3 and a friction pad 4 disposed on the front surface 2 or the rear surface 3 of the backing plate 1. Both the backing plate 1 and the friction pad 4 are well known in the art and will not be described in detail hereinafter. The friction pad 4 includes a friction material like for instance a material known under the commercial name of Ferodo which is glued or bonded in a conventional manner to the backing plate 1.

According to the invention, the backing plate 1 has a backing plate extension 5 extending therefrom. As shown in the appended figures, the backing plate 1 has preferably a substantially rectangular shape and the backing plate extension 5 extends from the longer side of the baking plate 1, such that the contact surface of the backing plate extension 5 to the backing plate 1 is larger. This results in a better thermal conduction with a higher transfer of the thermal energy through the direct contact between the backing plate 1 bearing the friction pad 4 and the backing plate extension 5.

Further, according to the invention, the backing plate extension 5 is provided with at least one cutout 6, and the at least one cutout 6 has an inner wall 7 surrounding the cutout 6. As best visible from FIG. 6, at least a part of the inner wall 7 is provided at an inclination other than 90° with respect to the area of the backing plate extension 5 adjacent to the cutout 6. In this way, even if the backing plate extension 5 is not planar, the cutout is at least locally inclined as compared to the adjacent portion of the backing plate extension 5. In other words, in the present description, the area of the backing plate extension adjacent to a cutout 6 can be regarded as partially generally planar and the inclination of the inner walls 7 of the cutout 6 other than 90° is referred only to that area adjacent to the cutout. To the extent that the backing plate extension 5 is planar, the inclination can be referred to the backing plate extension 5 in its entirety.

Preferably, as shown in the appended figures, the backing plate extension 5 is provided with a plurality of cutouts 6 and each cutout 6 has a respective inner wall 7 surrounding the cutout 6. As in the case of a single cutout, at least a part of each respective inner wall 7 is provided at an inclination other than 90° with respect to the area of the backing plate extension 5 adjacent to the respective cutout 6.

Figure 6:
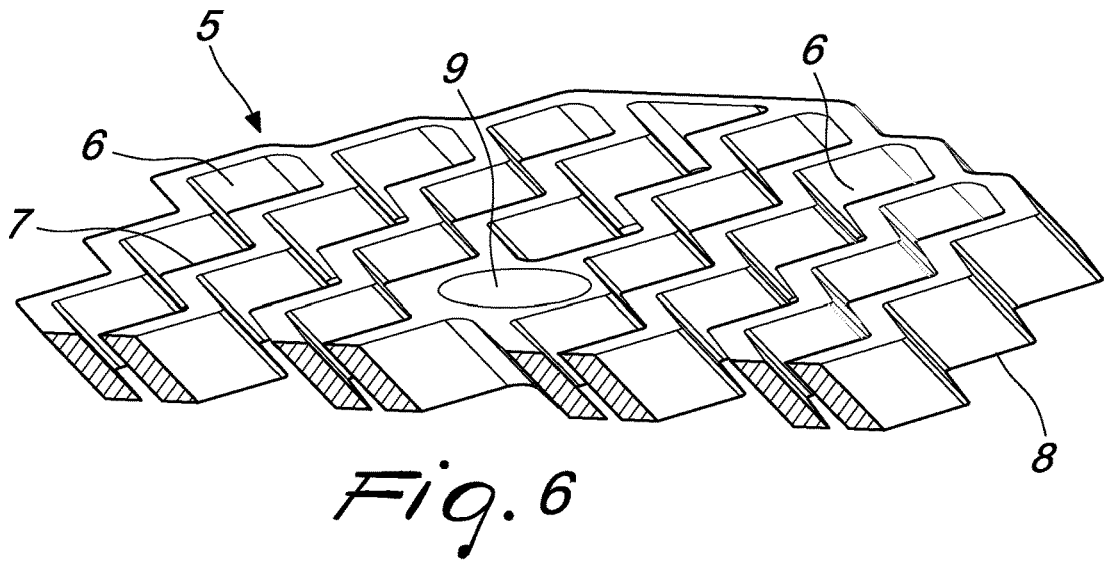
FIG. 6 is a schematic perspective cross-section view of the backing plate extension of the brake pad in accordance with the present invention better illustrating the inclination of the cutouts.

Yet again, as best visible from FIG. 6, at least a part of the inner wall 7 is provided at an inclination other than 90° with respect to the area of the backing plate extension 5 adjacent to the respective cutout 6. In this way, even if the backing plate extension 5 is not planar, any cutout is at least locally inclined as compared to the adjacent portion of the backing plate extension 5. In other words, in the present description, the area adjacent to a respective cutout 6 can be regarded as partially generally planar and the inclination of the inner walls 7 of the respective cutout 6 other than 90° is referred only to the area adjacent to the respective cutout. Yet again, to the extent that the backing plate extension 5 is planar, the inclination can be referred to the backing plate extension 5 in its entirety.

As shown in the appended figures, preferably, the backing plate extension 5 is planar and preferably the inclination of at least a part of each inner wall 7 is the same. The manufacturing constraints are simplified, if all inner walls 7 have the same inclination and if the backing plate extension 5 and preferably also the backing plate 4 are planar. The latter embodiment is particularly advantageous if the cutouts 6 are obtained by laser cutting. However, also alternative manufacturing methods like punching, stamping or casting can be envisaged.

Figure 6A:
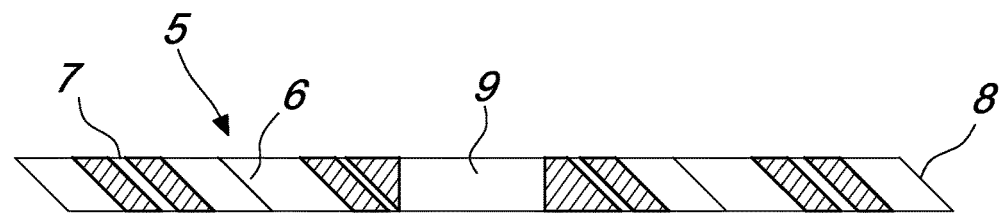
FIG. 6*a* is a sectional view of the brake pad of FIG. 1 taken along the line indicated as 6*a*-6*a* in said FIG. 1.

The inclination of the cutouts 6 is preferably from 30° to 60°, more preferably from 40° to 50° and most preferably of about 45° with respect to the backing plate extension 5. In this manner, the radiation of heat between opposing inner wall sections is minimized and the emission of heat is directed substantially away from an opposing inner wall section. It will be appreciated by the person skilled in the art that the most preferred angle of 45° directs the radiation of heat and thus the emission to the largest extent away from an opposing inner wall section. Similar considerations apply for the increase of surface of the backing plate extension 5 for the purpose of a better convection, as more surface area is available for the circulation of air. FIG. 6*a* shows the most preferred angle of 45° of the inner walls 7 of the cutouts 6 and the perimeter 8 in the sectional view taken along the line 6*a*-6*a* of FIG. 1. The connecting bolt hole 9 has perpendicular walls extending at an angle of 90°.

As shown in the figures, the cutouts 6 have a rhombic shape which, for the time being, has been considered the most preferred shape in terms of thermal dissipation and/or manufacturing constrains. However, in alternative, the cutouts 6 may have a shape selected from circular, elliptic, triangular, rectangular, pentagonal, hexagonal and polygonal.

Advantageously the backing plate 1 and/or the backing plate extension 5 has/have a thickness from 1.5 mm to 2.0 mm, more preferably from 1.5 mm to 1.9 mm and most preferably from 1.5 mm to 1.8 mm. Such dimension, in particular in conjunction with a steel made backing plate and/or backing plate extension are advantageous in terms of stability and stiffness on one hand and overall size on the other.

In the currently preferred embodiment, as shown in the appended figures, the backing plate 1 and the backing plate extension 5 are coplanar and have the same thickness. However, the backing plate 1 and/or the backing plate extension 5 may also be curved or slightly curved. In particular, a curved or slightly curved backing plate extension 5 increases the surface available to thermal dissipation as compared to a planar backing plate extension 5 having the same radial extension in the mounted state thereof.

As discussed hereinabove, the backing plate 1 and/or the backing plate extension 5 are made of metal, preferably of steel. However, also alternative materials like aluminum alloys or magnesium alloys are conceivable.

As shown in FIG. 1, the backing plate 1 is substantially rectangular and the friction pad 4 takes up about 70% of the front surface 2 thereof. In this manner, a good thermal contact is established between the backing plate 1 and the friction pad 4.

Figure 7:
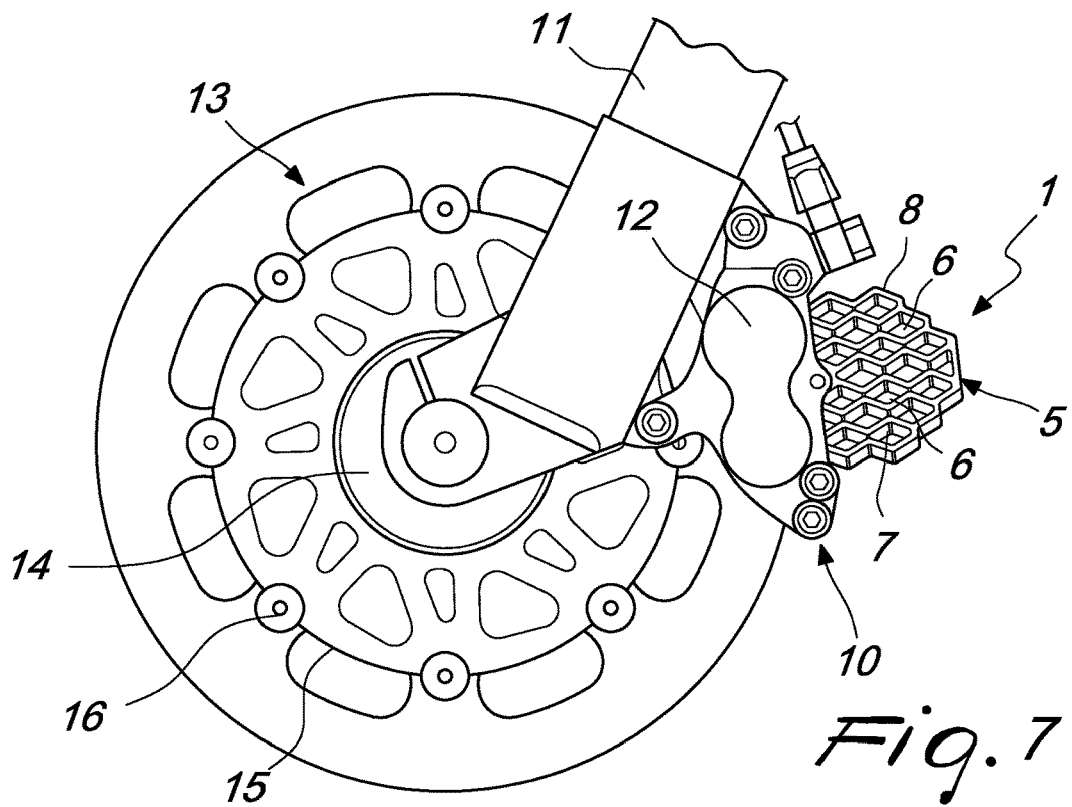
FIG. 7 is a schematic lateral view of a brake pad in accordance to the present invention installed to a conventional disc brake assembly.

With reference to FIGS. 1 and 4 the backing plate extension 5 may include a connecting bolt hole 9 for mounting the brake pad to a brake caliper which is shown in FIG. 7. The function of the connecting bolt hole 9 is well known to a person skilled in the art and will not be discussed in detail herein.

According to a particularly advantageous feature of the present invention, the inclination of the inner wall 7 of the cutout 6 is such that the opposing sections of the inner wall 7 of the cutout 6 only partially face each other or do not face each other at all. Therefore, the radiation or emission of thermal energy from any section of the inner wall 7 does not impinge or only slightly impinges on an opposing inner wall section. In other words, the inclination of the inner wall 7 of the cutout 6 is such that the inner wall 7 has a section which directs the radiation heat in part or fully away from the opposing section of the inner wall 7.

With reference to FIG. 7 there is shown a backing plate 1, wherein the backing plate extension 5 extends out of a brake caliper 12 in the mounted state thereof in a radial extension as compared to a wheel on which the brake pad is mounted. The extension out of a brake caliper 12 is preferably in the order of 10 mm to 60 mm. As the caliper 12 along with the disc brake assembly 10 are conventional and well known in the art, the same will not be described in detail hereinafter. For the sake of completeness it should be noted that the disc brake assembly 10 includes, apart from the disk brake caliper 12, a disc brake rotor 13 and a hub 14. Further, optionally the diss brake assembly 10 may include a disc brake spider 15 and rivets 16 therefore.

As shown in the appended figures, the backing plate extension 5 has a generally rectangular configuration with a tip pointing away from the backing plate 1, such that the portion of the backing plate extension 5 adjacent to the backing plate 1 is wider than the portion of the backing plate extension 5 distant to the backing plate 1. In this manner the overall dissipation of heat of the brake pad of the present invention may be advantageously improved.

Further, as also shown in the appended figures, the backing plate 1 has a leading edge 1*a* and a trailing edge 1*b*, as compared to the direction of rotation of the disc brake rotor. The backing plate extension 5 has a generally rectangular configuration and the extent of the backing plate extension 5 between the leading edge 1*a* and trailing edge 1*b* is shorter than the extent of the backing plate extension 5 extending away from the backing plate 1. In this manner the overall dissipation of heat of the brake pad of the present invention may be advantageously improved.

The backing plate extension 5 has a perimeter 8 and at least a part of the perimeter 8 is advantageously provided at an inclination other than 90° with respect to the area of the backing plate extension 5 adjacent to the perimeter 8. The inclined perimeter also advantageously contributes to the increase of the thermal dissipation of the brake pad according to the present invention.

Preferably the backing plate extension 5 is planar and the inclination of the perimeter 8 is the same as the inclination of the inner wall 7.

According to an advantageous aspect, the cutouts 6 take up 30% to 90% of the surface of the backing plate extension 5, more preferably 50% to 80% of the surface of the backing plate extension 5 or up 60% to 80% of the surface of the backing plate extension 5. The latter cutout extension maximizes the surface available to heat dissipation both in terms of emission and convection and also reduces the weight of the backing plate extension.

The disclosure of the present invention includes all modifications and equivalents of the subject matter recited in the claims appended hereto as permitted by applicable law. Moreover, any combination of the above-described elements in all possible variations thereof is encompassed by the disclosure unless indicated otherwise herein.

Where technical features mentioned in any claim are followed by reference signs, the reference signs have been included for the sole purpose of increasing the intelligibility of the claims and accordingly, neither the reference signs nor their absence have any limiting effect on the technical features as described above or on the scope of any claim elements.

One skilled in the art will realize the disclosure may be embodied in other specific forms without departing from the disclosure or essential characteristics thereof. The foregoing embodiments are therefore to be considered illustrative rather than limiting to the disclosure described herein in all respects. The scope of the invention is thus indicated by the appended claims, rather than the foregoing description, and all changes that come within the meaning and range of equivalence of the claims are therefore intended to be embraced therein.

LIST OF REFERENCE NUMERALS 1 backing plate
1a leading edge of the backing plate
1b trailing edge of the backing plate
2 front surface of backing plate
3 rear surface of backing plate
4 friction pad
5 backing plate extension
6 cutout(s)
7 inner wall of cutout
8 perimeter of the backing plate extension
9 connecting bolt hole
10 disk brake assembly
11 front fork
12 disc brake caliper
13 disc brake rotor
14 hub
15 disc brake spider
16 rivets

The invention claimed is:

1. A brake pad for a bicycle or a motorbike disc brake assembly comprising:
a backing plate having a front surface and a rear surface,
a friction pad disposed on the front surface or the rear surface of the backing plate, and
a backing plate extension extending from the backing plate, wherein the whole backing plate extension is planar,
wherein the backing plate extension is provided with at least one cutout, wherein the at least one cutout has an inner wall surrounding the cutout, and wherein the whole inner wall is provided at a same inclination with respect to the backing plate extension, wherein the inclination is from 30° to 60° with respect to the backing plate extension.

2. The brake pad of claim 1, wherein the backing plate extension is provided with a plurality of cutouts.

3. The brake pad of claim 2, wherein the cutouts take up 30% to 90% of the surface of the backing plate extension.

4. The brake pad of claim 1, wherein the cutout has a shape selected from circular, elliptic, triangular, rectangular, rhombic, pentagonal, hexagonal and polygonal.

5. The brake pad of claim 1, wherein the backing plate and/or the backing plate extension has/have a thickness from 1.5 mm to 2.0 mm.

6. The brake pad of claim 1, wherein the backing plate and the backing plate extension are coplanar and have the same thickness or wherein the backing plate is slightly curved.

7. The brake pad of claim 1, wherein the backing plate and/or the backing plate extension are made of steel.

8. The brake pad of claim 1, wherein the backing plate is substantially rectangular and the friction pad takes up about 70% of the front surface or rear surface thereof.

9. The brake pad of claim 1, wherein the backing plate extension includes a connecting bolt hole for mounting the brake pad to a brake caliper.

10. The brake pad of claim 1, wherein the inclination of the inner wall of the cutout is such that the opposing sections of the inner wall of the cutout only partially face each other or do not face each other at all.

11. The brake pad of claim 1,
wherein the inclination of the inner wall of the cutout is such that the inner wall has a section which directs radiation heat in part or fully away from the opposing section of the inner wall.

12. The brake pad of claim 1, wherein the backing plate extension extends out of a brake caliper in the mounted state thereof in a radial extension as compared to a wheel on which the brake pad is mounted, wherein the extension out of the brake caliper is in the order of 10 mm to 60 mm.

13. The brake pad of claim 1, wherein the backing plate extension has a generally rectangular configuration with a tip pointing away from the backing plate, such that the portion of the backing plate extension adjacent to the backing plate is wider than the portion of the backing plate extension distant to the backing plate; and/or
wherein the backing plate is provided with a leading edge and a trailing edge, wherein the backing plate extension has a generally rectangular configuration, and wherein the extent of the backing plate extension between the leading edge and trailing edge is shorter than the extent of the backing plate extension extending away from the backing plate.

14. The brake pad of claim 1, wherein the backing plate extension has a perimeter and wherein at least a part of the perimeter is provided at an inclination other than 90° with respect to the area of the backing plate extension adjacent to the perimeter.

15. The brake pad of claim 14, wherein the inclination of the perimeter is the same as the inclination of the inner wall.

* * * * *